United States Patent [19]

Murayama et al.

[11] 3,733,912
[45] May 22, 1973

[54] TRANSMISSION FOR FARM TRACTOR

[75] Inventors: Yoshinobu Murayama; Tadashi Morimoto; Mikio Kinoshita; Isamu Yamanishi, all of Sakai-shi, Osaka, Japan

[73] Assignee: Kubotatekko Kabushikigaisha, Osaka, Japan

[22] Filed: May 24, 1971

[21] Appl. No.: 146,149

[30] Foreign Application Priority Data

May 25, 1970 Japan.............................45/51690
May 25, 1970 Japan.............................45/51691

[52] U.S. Cl. ..................74/15.4, 74/15.86, 74/360
[51] Int. Cl. .........................F16h 37/06, F16h 3/08
[58] Field of Search..............74/15.4, 15.66, 15.86, 74/15.88, 360

[56] References Cited

UNITED STATES PATENTS

| | | |
|---|---|---|
| 3,597,998 | 8/1971 | Ebert........................................74/687 |
| 1,961,809 | 6/1934 | Wood....................................74/15.4 X |
| 2,347,352 | 4/1944 | Lapsley..............................74/15.66 X |
| 2,618,979 | 11/1952 | Benning...................................74/15.4 |
| 3,301,078 | 1/1967 | Michael..............................74/360 X |

FOREIGN PATENTS OR APPLICATIONS

| | | | |
|---|---|---|---|
| 1,221,572 | 1/1960 | France.................................74/15.4 |
| 1,274,905 | 9/1961 | France.................................74/15.4 |
| 886,326 | 1/1962 | Great Britain.....................74/15.4 |
| 909,159 | 10/1962 | Great Britain.....................74/15.4 |

*Primary Examiner*—Leonard H. Gerin
*Attorney*—James E. Armstrong and Harold C. Wegner

[57] ABSTRACT

A transmission comprising a primary speed change mechanism including a main shaft provided with a plurality of gears for power transmission, an upper counter shaft and a lower counter shaft disposed in parallel on the opposite sides of the main shaft, the upper counter shaft being provided with a group of speed change gears for running the tractor, the lower counter shaft being equipped with a group of speed change gears for power takeoff. The upper counter shaft is coupled with a secondary speed change mechanism including a bevel pinion shaft which is provided with gears in meshing engagement with gears on the extension of the upper counter shaft and a bevel pinion meshing with a bevel gear. The lower counter shaft also extends in parallel relation to the upper counter shaft and is coupled with a power takeoff shaft so as to provide live power takeoff independent of the speed of the tractor and ground power takeoff in synchronism with the speed of the tractor.

4 Claims, 4 Drawing Figures

TRANSMISSION FOR FARM TRACTOR

BACKGROUND OF THE INVENTION

The present invention relates to a transmission for farm tractors which includes an intermediate means for transmitting the torque of the engine to the drive wheels and to the power takeoff mechanism and, more particularly to improvements in the transmission.

As compared with automotive transmissions, the transmission for farm tractors provides much greater speed change ratios for low speeds and requires more speed changes, so that the speed change gear system must be extremely complicated in construction which requires designing and machining procedures, while the shaft structure which has to be arranged in a limited space tends to give rise to objectionable results. Thus there is a need to provide a transmission which is simplified to the greatest possible extent, is low in manufacturing cost and capable of giving versatile speed changes.

Especially in the case of a transmission providing so-called live power takeoff (hereinafter referred to as "PTO") wherein the power takeoff shaft is selectively driven independently of the running speed. In this case an ingenious effort is necessary in order to provide a more simplified construction at a lower cost.

With tractors already known, there is a tendency to employ a main clutch of the two-step depression type. Generally the clutch of this type is so constructed that when the clutch pedal is depressed to a first step, only the flow of power for running the tractor is interrupted, with the power takeoff, hydraulic pump, and the like, kept in operation, and when it is depressed fully to a second step, the entire flow of power is interrupted.

Accordingly, the output shaft of the clutch is built in the form of a double shaft consisting of a solid shaft and a hollow shaft surrounding the outer periphery of the solid shaft in sheath-like manner. However, the hollow shaft is very costly to manufacture and has prevented extensive use of farm tractors.

SUMMARY OF THE INVENTION

This invention provides a transmission which does not employ a clutch of the above-mentioned two-step depression type and, instead, involves a system in which the speed change shaft for transmitting the torque of the engine to the drive wheels and the power takeoff upon speed change comprises three shafts, namely a main input shaft, a counter shaft for running the tractor and a counter shaft for power takeoff, which are arranged such that the three shafts being supported in parallel on a transmission case. This simple construction enables a power takeoff shaft connected to the power takeoff counter shaft to be independent of the counter shaft for running and also independent of a bevel pinion shaft coupled with the extension of the running counter shaft respectively, so as to give speed change ratios for power takeoff and for running the tractor independently. Accordingly, even when transmission of running power is interrupted, the power takeoff shaft system can be driven independently of the running shaft system, so-called live power takeoff thus being provided.

A primary object of this invention is therefore to provide a transmission wherein a primary speed change mechanism comprises three shafts in parallel so that the primary speed change mechanism can be built with a simple structure without requiring special machining for the shaft construction in order to give accurate live PTO.

Another object of this invention is to provide a transmission wherein a clutch other than the main clutch for effecting and interrupting power transmission, namely, the engine clutch, is mounted between the primary speed change mechanism for running tractor and secondary speed change mechanism for running, so as to give live PTO effectively.

Another object of this invention is to provide a transmission incorporating a live PTO speed change mechanism wherein the main shaft of a primary speed change mechanism for running is employed in common.

Still another object of this invention is to provide a transmission which is capable of giving so-called ground PTO in synchronism with the speed of tractor by incorporating therein an additional simple construction.

DETAILED DESCRIPTION OF THE PREFERRED EMBODIMENTS

Figure 1:
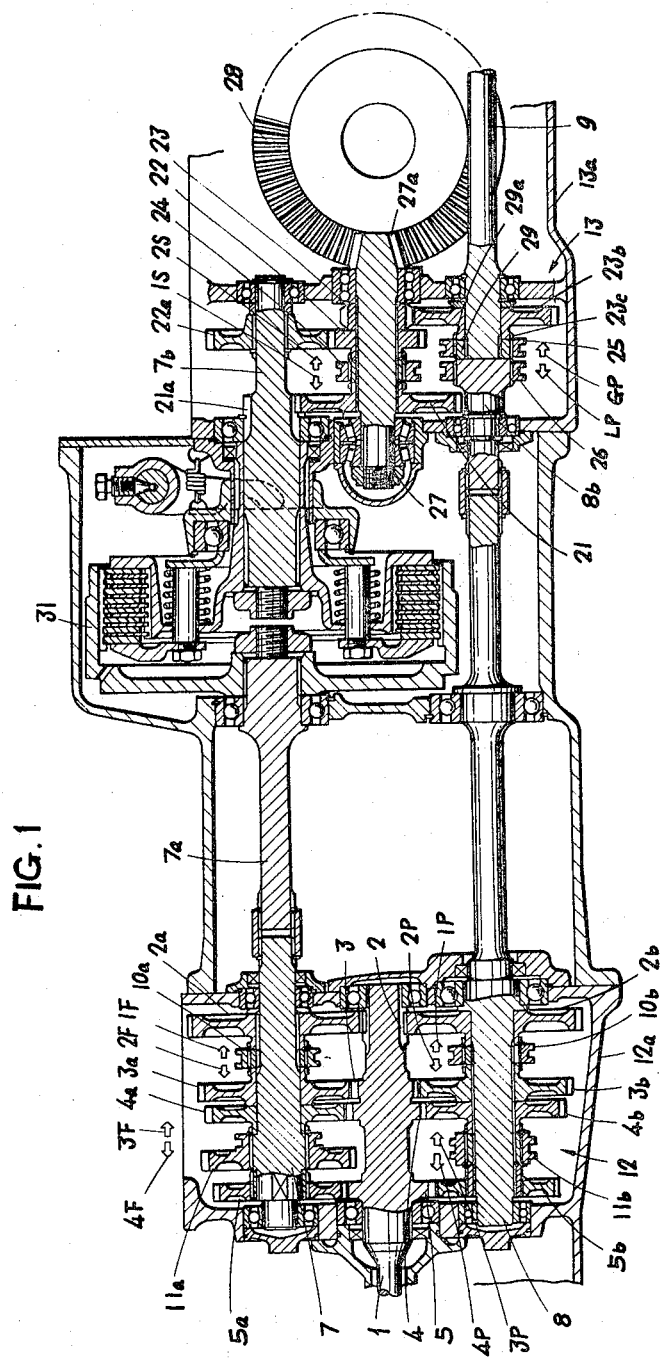
FIG. 1 is a view in section showing the interior construction of an important embodiment of transmission in accordance with this invention.

Referring to FIG. 1, a primary speed change mechanism 12 is housed within a case 12a. Mounted in a secured fashion on a main shaft 1 for transmitting the torque from the engine are a group of gears 2, 3, 4 and 5 for power transmission. Disposed on the upper and lower sides of the main shaft 1 are an upper counter shaft 7 for running the tractor and a lower counter shaft 8 for power takeoff. These shafts are positioned in parallel, with the main shaft 1 interposed therebetween. Gears 2a, 3a, 4a and 5a mesh with the gears 2, 3, 4 and 5 and are continually mounted on the upper counter shaft 7 for free rotation thereon. This group of gears serves as speed change gears for running. Respectively between the gears 2a and 3a and between the gears 4a and 5a are mounted connecting sleeves 10a and 11a on the upper counter shaft 7 by means of spline so as to be slidable in the axial directions and rotate with the shaft 7. A group of power takeoff gears 2b, 3b, 4b and 5b respectively meshing with the power transmission gears 2, 3, 4 and 5 on the main input shaft 1 and are continually mounted on the lower counter shaft 8 for free rotation. In the same manner as above, connecting sleeves 10b and 11b are disposed between these gears, namely between the gears 2b and 3b and between the gears 4b and 5b respectively.

Each two gears in corresponding relation with the speed change gears 2a, 3a, 4a and 5a for running and speed change gears 2b, 3b, 4b and 5b for power takeoff have the same number of teeth. The speed change ratio is varied as desired by shifting the connecting sleeves 10a, 10b, 11a, 11b in the longitudinal directions of the shafts 7, 8. Such a speed change mechanism, called a constant-mesh mechanism, is already used generally. Thus, when the connecting sleeve 10a is slidably moved in the directions of arrows 1F and 2F to effect connection, speed change ratios of the first and second forward speeds are provided respectively, and when the connecting sleeve 11a is likewise shifted in the directions of arrows 3F and 4F, third and fourth forward speeds are produced. Although the description and illustration of reverse speed change is omitted, the transmission can of course provide reverse speed change ratios as desired. In this way, four forward speeds are available for desired selection.

The upper counter shaft 7 is directly coupled with a counter shaft extension 7a and connected to a clutch 31 for effecting or interrupting power transmission as desired. In the illustrated embodiment, a clutch of the multiple friction disk type is employed, but it may be of any desired type. Since the operation and function of the clutch are well known in the art, description thereof will not be given. An extension 7b of the upper counter shaft 7 which is coupled or uncoupled with the shaft 7 by the clutch 31 to effect or interrupt power transmission as desired is fixedly provided in a secured relation with gears 21a and 22a always meshing with gears 21 and 22 which are mounted in idly rotatable manner on a bevel pinion shaft 27 rotatably supported in parallel with the extension 7b. Thus by way of a bevel pinion 27a on the rear end of the shaft 27, bevel gear 28 and final mechanism, the power is transmitted to drive wheels. Disposed between the gears 21 and 22 is a connecting sleeve 24, which rotates integrally with the bevel pinion shaft 27.

Accordingly, shifting of the connecting sleeve 24 in the axial direction indicated at arrow 1S or 2S selectively produces a first or second speed of secondary speed change for the torque of the counter shaft extension 7b.

More specifically, a secondary speed change mechanism 13 including the counter shaft extension 7b and the bevel pinion shaft 27 is housed in a case 13a, and the four forward speeds provided by the extension 7b give eight forward speeds to the bevel pinion shaft 27 and the resulting torque is delivered to the drive wheels through bevel pinion 27a, bevel gear 28 and final mechanism.

The speed change means for power takeoff in the primary speed change mechanism is similar to the running speed change means already described. When the connecting sleeve 10b is shifted in the directions of arrows 1P and 2P to effect connection, speed change ratios to give first and second PTO speeds are produced. If the connecting sleeve 11b is shifted in the directions of arrow 3P and 4P, third or fourth PTO speeds are obtained. The lower counter shaft 8 is provided at its rear end with extensions 8a and 8b in parallel relation to the upper counter shaft extensions 7a and 7b. Provided at the junction where the lower counter shaft extension 8b is connected to a power takeoff shaft 9 is a clutch means comprising connecting sleeves 25 and 26 for selectively determining whether the power is directly delivered to the power takeoff shaft 9 or it is produced as a ground PTO coupled with the bevel pinion shaft 27 for synchronization with the running speed. An idle gear 23b is mounted on the power takeoff shaft 9 for free rotation thereon always in meshing engagement with a gear 23 on the bevel pinion shaft 27.

When the connecting sleeves 25 and 26 are shifted in the direction of an arrow LP, the power takeoff shaft 9 is provided with four PTO speeds which are the same as those of the lower counter shaft 8. To obtain ground PTO, when the power transmission to the upper counter shaft extension 7b is interrupted by the clutch 31, the connecting sleeve 25 of the connecting sleeves 25 and 26 constituting the clutch means is shifted in the direction of an arrow GP into engagement with a spline 23c formed at the end of a gear 23b. The other counter sleeve 26 is then likewise shifted in the direction of the arrow GP into engagement with the spline 29a of a connecting boss 29 engaged with the spline at the end of the power takeoff shaft 9, whereby four speeds of the lower counter shaft 8 are transmitted from the gear 23b to the gear 23 to operate the drive wheels by way of the bevel pinion shaft 27, bevel pinion 27a, bevel gear 28 and final mechanism. In this way, the power takeoff shaft 9 and bevel pinion shaft 27 are rotated in synchronism, the power takeoff shaft 9 thus giving ground PTO.

Further, when the clutch 31 is acting to transmit the power, shifting of only the connecting sleeve 25 in the direction of the arrow GP interrupts the flow of power through the PTO drive system and the rotation of the bevel pinion shaft 27 is transferred from the gear 23 to the gear 23b so as to cause the power takeoff shaft 9 to rotate at a lower speed than is the case with the ground PTO already described.

Figure 3:
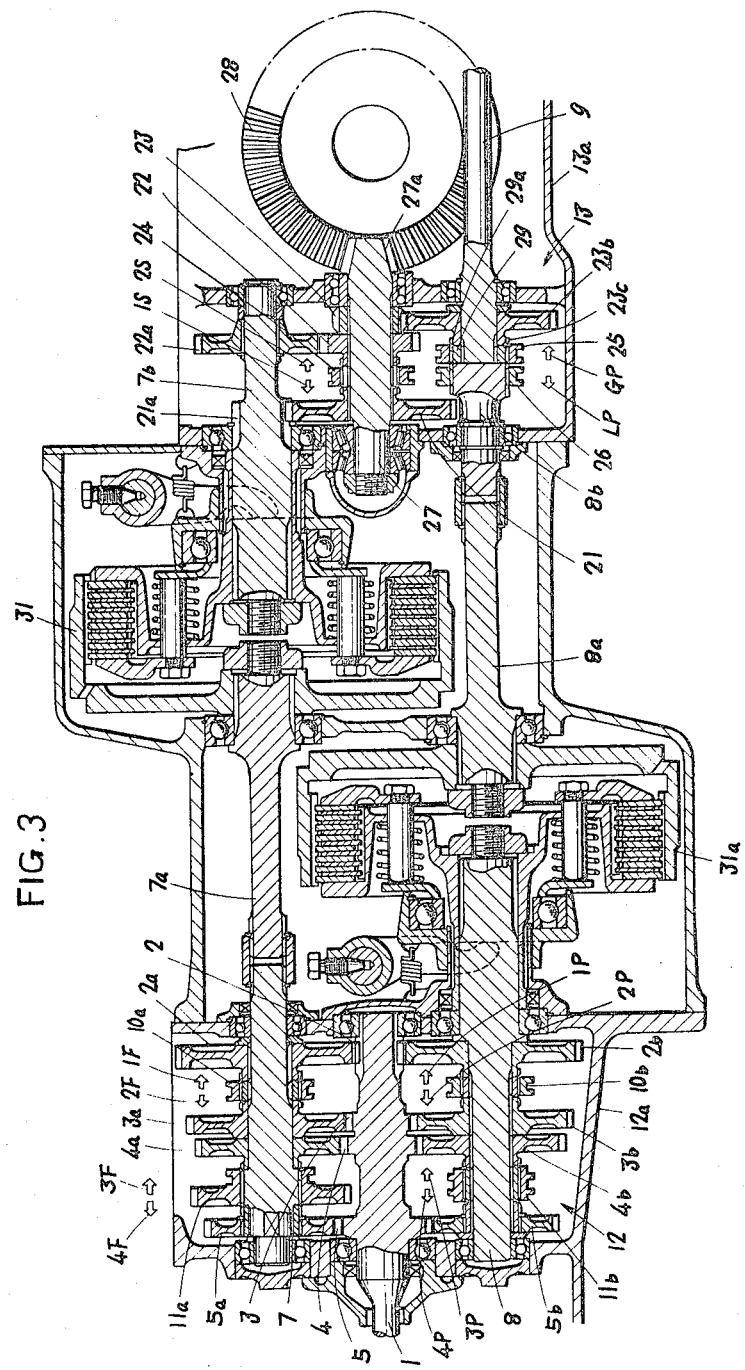
FIG. 3 is a view in section showing the transmission of FIG. 1 in which another clutch is disposed intermediately in the power transmission system of the power takeoff counter shaft and the power takeoff shaft.

FIG. 3 illustrates another useful embodiment of this invention wherein a multiple frictional disk clutch 31a of the same type as the clutch 31 described with reference to FIG. 1 is disposed at an intermediate portion of the power takeoff transmission system composed of the lower counter shaft 8 and the power takeoff shaft 9, with the clutch 31a being mounted at the junction of the lower counter shaft 8 and the extension 8a thereof.

The provision of the clutch 31a at the intermediate portion of the power transmission system of the lower counter shaft 8 and the power takeoff shaft 9 ensures that when the clutch 31 is first brought to the disengaged position the PTO is driven even if the tractor is brought to a halt, and that when both clutches 31 and 31a are in operation for power transmission, namely when the tractor is travelling, PTO can be stopped by disengaging the clutch 31a. The other detailed construction and operation are the same as with the embodiment of FIG. 1 already described.

Figure 2:
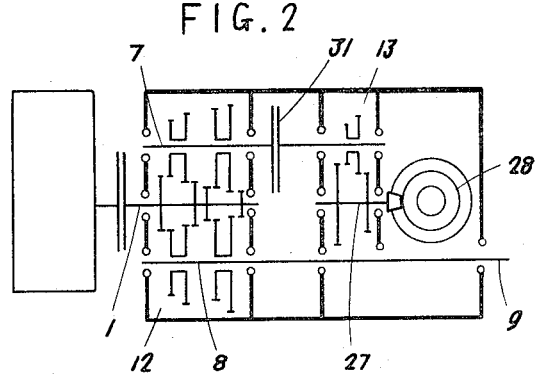
FIG. 2 is a schematic diagram showing an embodiment in which the group of running gears and the group of power takeoff gears in the transmission of FIG. 1 are employed to effect another mode of speed change.
Figure 4:
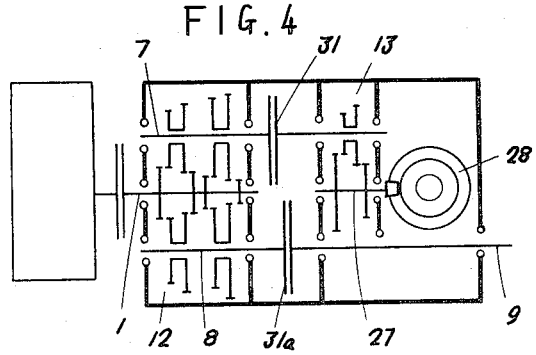
FIG. 4 is a schematic diagram showing an embodiment in which the group of running gears and the group of power takeoff gears in the transmission of FIG. 3 are employed to effect another mode of speed change.

In the embodiments schematically shown in FIGS. 2 and 4, the mode of speed change effected differs from that achieved by respective groups of gears in the running power transmission system and in power takeoff transmission system constituting the primary speed change mechanism 12 which has already been described with reference to FIGS. 1 and 3. Whereas the foregoing embodiments employ a constant-mesh mechanism, the embodiments illustrated in FIGS. 2 and 4 are of the sliding selective type.

More specifically, the main input shaft 1 of a primary speed change mechanism 12 is fixedly provided in a secured fashion with a group of power transmission gears as above. Disposed on the upper and lower sides of the main shaft 1 are an upper counter shaft 7 and a lower counter shaft 8 which are positioned in parallel, with the main shaft 1 interposed therebetween. Speed change gears are mounted on the counter shafts by means of spline and adapted for sliding movement in axial directions. The speed change gears on the upper counter shaft 7 and the lower counter shaft 8 in corresponding relation have the same number of teeth. The upper counter shaft 7 and the lower counter shaft 8 are thus adapted to be driven at selected ratios. By means of a clutch 31, the extension 7b of the upper counter shaft in a secondary speed change mechanism 13 can be selectively coupled with the upper counter shaft 7 to effect or interrupt power transmission. Speed change gears mounted on the extension 7b and slidable in axial directions are adapted to selectively mesh with gears keyed to a bevel pinion shaft 27 so as to selectively determine the running speed.

An extension extending from one end of the lower counter shaft 8 serves as a power takeoff shaft 9. Thus, even when the power transmission is interrupted on the upper counter shaft, namely on the running shaft system under the action of the clutch 31, the power takeoff shaft 9 can be driven independently thereof to provide live PTO.

As is apparent from the description of the above preferred embodiments, the present invention provides a primary speed change mechanism comprising speed change means for running the tractor and a speed change means for power takeoff. The primary speed change mechanism, more specifically comprises three shafts, namely a main shaft for input takeoff and upper and lower shafts disposed in parallel with the main shaft interposed therebetween. Accordingly, multiple speed changes can be obtained with a relatively simple construction.

Since the main shaft is used in common for running power transmission means and power takeoff transmission means, the running power system gives live PTO and ground PTO rotations and similarly, the power takeoff system gives both live PTO and ground PTO rotations. Because of this, the shaft construction of the present invention is much more simplified and inexpensive to manufacture by machining than with the conventional construction employing a main shaft of the double shaft type. Furthermore, the fact that the gears in corresponding relation in the group of speed change gears for running and in the group of speed change gears for power takeoff which mesh with gears on the common main shaft are identical ensures the advantage that the parts are limited in kind, extremely simple to manufacture and easy to take care of. In addition, the speed change gears disposed in a simple arrangement symmetrically of a horizontal line can be taken apart readily and with difficulty. The extremely simplified arrangement of the change gear systems for installation in a small space further assures trouble-free operation. The speed change mechanism comprising three shafts thus provides multiple speed change means for running the tractor and multiple PTO and live PTO speed change means and has high amenability to design and machining.

To perform work on the farm, there arises a need to operate an implement connected to the tractor, with the tractor retained in a halted position. In such instances, the clutch mounted in the running speed change system intermediately between the primary speed change mechanism and the secondary speed change mechanism is disengaged to interrupt power transmission, whereby live PTO will be obtained independently of the speed of the tractor.

On the other hand, there is a need to perform work by operating an implement on the tractor in synchronism with the speed of the tractor. For this purpose, when the running speed change system is in operation for transmission, the connecting sleeve is shifted to couple the gear on the bevel gear shaft with the gear on the upper counter shaft extension so as to provide ground PTO at a low speed through the meshing engagement of the gear on the bevel pinion shaft with the gear on the power takeoff.

Further, if the running speed change system is in non-transmission state, the connecting sleeves interposed between the lower counter shaft extension and the power takeoff shaft in the power takeoff speed reduction system are shifted to effect coupling and thereby give ground PTO.

Thus the mechanism by which multiple change PTO rotation is given in the form of live PTO assures that the power takeoff shaft can be rotated independently with the tractor retained in the halted position, with the result that the implements for farm work can be rendered more efficient to operate and serviceable for wider applications.

Various advantages of this invention are now fully apparent from the forgoing description. Needless to say, further addition, substitution and alteration may be made for the present structure without departing from the scope of the appended claims. For instance, synchronized-mesh system may be employed for the selection of gears.

What is claimed is:

1. A transmission for a farm tractor comprising a primary speed change mechanism and a secondary speed change mechanism, said primary speed change mechanism including three shafts of a main input shaft provided with a plurality of gears for power transmission, an upper counter shaft provided with a group of speed change gears for running the tractor and a lower counter shaft provided with a group of speed change gears for power takeoff, said upper and lower counter shafts being disposed in parallel on the opposite sides of said main shaft with said main shaft interposed therebetween, said groups of speed change gears for running and power takeoff being in meshing engagement with said gears on said main shafts, respective corresponding gears in opposite relation in said groups of speed change gears having the same number of teeth, said secondary speed change mechanism including an extension extending from the rear end of said upper counter shaft and provided with gears and a bevel pinion shaft provided with gears meshing with said gears on said extension and a bevel pinion meshing with a bevel gear, said lower counter shaft being provided at its rear end with an extension coupled with a power takeoff shaft.

2. The transmission for a farm tractor as set forth in claim 1 wherein a clutch is intermediately disposed in a power transmission system for running the tractor comprising said upper counter shaft and said upper counter shaft extension.

3. The transmission for a farm tractor as set forth in claim 1 wherein a clutch is intermediately disposed in a power transmission system for running the tractor comprising said upper counter shaft and said upper counter shaft extension and another clutch is intermediately disposed in a power transmission system for power takeoff comprising said lower counter shaft, said lower counter shaft extension and said power takeoff shaft.

4. The transmission for a farm tractor as set forth in claim 1 wherein said power takeoff shaft of a power transmission system for power takeoff comprising said lower counter shaft, said lower counter shaft extension and said power takeoff shaft is provided with a gear, said bevel pinion shaft constituting said secondary speed change mechanism being provided with a gear meshing with said gear on said takeoff shaft, a clutch for meshing and de-meshing said gears being interposed between said power takeoff shaft and said lower counter shaft extension.

* * * * *